J. WEBSTER.
WIND SHIELD.
APPLICATION FILED FEB. 4, 1907.
1,023,901.
Patented Apr. 23, 1912.
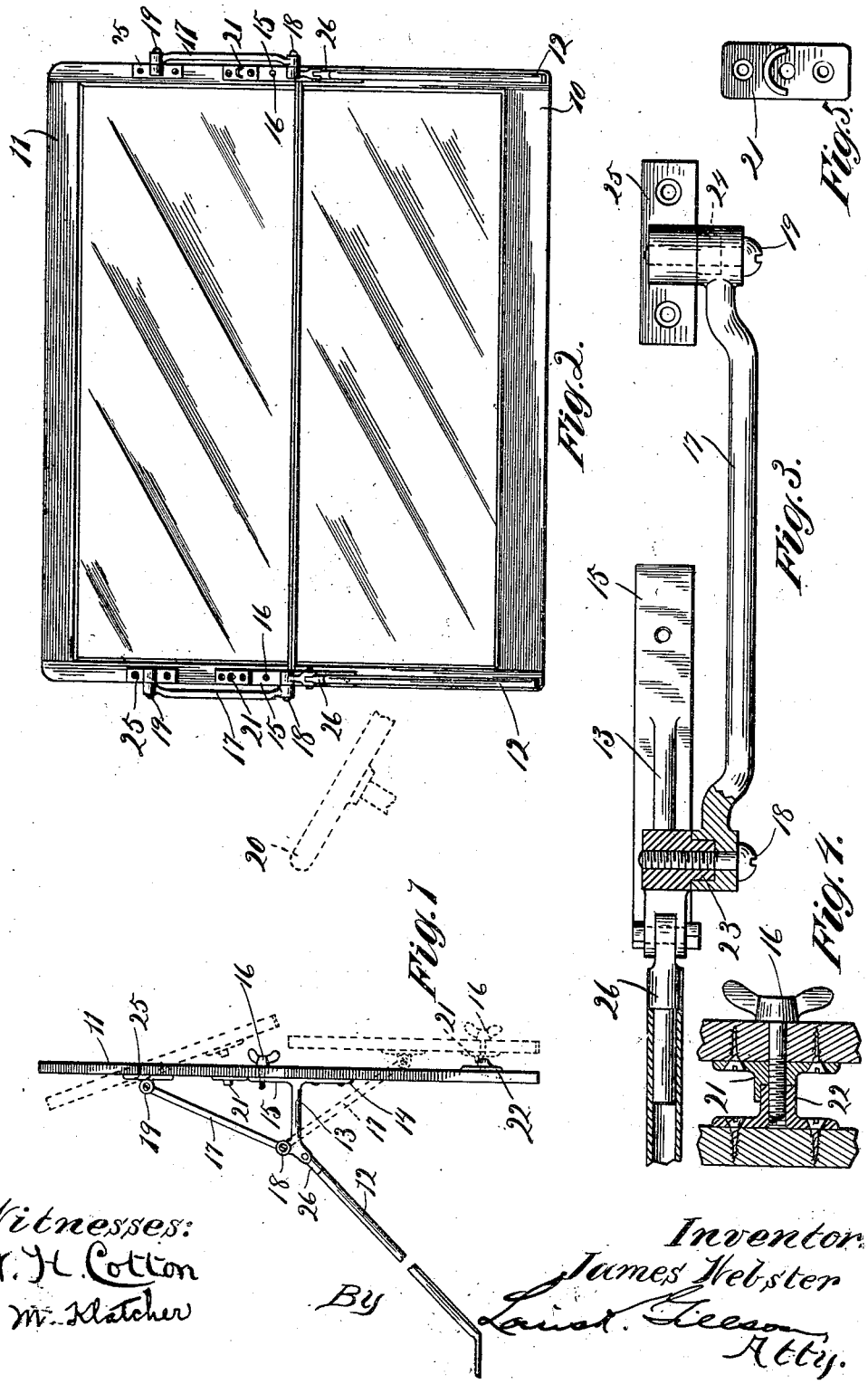

UNITED STATES PATENT OFFICE.

JAMES WEBSTER, OF CHICAGO, ILLINOIS, ASSIGNOR TO CHICAGO COACH & CARRIAGE CO., OF CHICAGO, ILLINOIS.

WIND-SHIELD.

1,023,901.

Specification of Letters Patent. Patented Apr. 23, 1912.

Application filed February 4, 1907. Serial No. 355,655.

*To all whom it may concern:*

Be it known that I, JAMES WEBSTER, a citizen of the United States, and a resident of Chicago, in the county of Cook and State of Illinois, have invented certain new and useful Improvements in Wind-Shields, of which the following is a specification.

The invention relates to wind shields for automobiles, its object being to provide a sectional shield which may be rigidly supported, or compactly and conveniently folded and securely held in its folded form.

It consists in the structure hereinafter described and which is illustrated in the accompanying drawings, in which,—

Figure 1 is a detail side elevation of the shield and of the steering wheel of an automobile, the steering wheel and changes of position being indicated by dotted lines; Fig. 2 is a front elevation of the shield; Fig. 3 is a detail of the supporting mechanism, partly in section; Fig. 4 is a detail in section of the means for securing the shield when folded; and Fig. 5 is a detail of one of the parts shown in Fig. 4.

The shield comprises the two glazed frames 10, 11; the one to rest upon the dash board (not shown) of an automobile, and one to be mounted on top of the other when in service. The lower section 10 may be, if desired, secured to the dash board and is stayed by means of a pair of rods 12 projecting forward and downward and being adapted for attachment to a fixed part of the machine. Preferably each of the rods 12 is attached to the shield section through the medium of a bracket 13, one arm 14 of which is secured to the frame of the shield section, its other arm 15 projecting upwardly to receive the upper shield section 11. A screw bolt 16, preferably having wings for convenience of manipulation, sets through the frame of the shield section 11 and secures it to the bracket. The upper shield section is stayed by means of a pair of links 17 each attached at 18 to one of the brackets 13 and at 19 to the shield section. The attaching means at 18 and 19 being pivots, serve also with the link 17 as a hinge upon which the upper shield section may swing, when the screw 16 is withdrawn, without being overturned and hence without interference with the steering wheel 20 of the automobile.

A pair of shouldered bosses 21 project from the front face of the side members of the upper shield section and are adapted to engage a pair of bosses projecting from the rear face of the side members of the lower shield section, when the device is folded. The bosses 21, 22 are apertured, the aperture of the latter being threaded, and the frame of the upper shield section being also apertured back of the boss 21, the screw 16 may be inserted to secure the parts firmly together. When so secured the links 17 again act as stays.

The details of the joints 18, 19 are shown in Fig. 3. The pivot apertures of the link 17 are counterbored to receive bosses 23—24, formed on the bracket 13 and the bracket 25 which constitutes a part of the joint 19. This construction insures firm joints and prevents rattling.

To provide for the easy adaptation of the device to automobiles of different designs, the rod 12 is preferably attached to the bracket 13 by means of a knuckle 26 to which the rod may be attached, as by a brazing operation, the rod being tubular or socketed to receive a reduced end of the knuckle. This arrangement permits the cutting of the rod to a suitable length.

I claim as my invention:—

1. In a wind-shield, in combination, a fixed section, a movable section, brackets attached to the fixed section one adjacent each end thereof, and a pair of links each attached to one of the brackets and to an end of the movable section by means of fixed pivots.

2. In a wind shield, in combination, a plurality of sections, lateral supports for one of the sections, and links pivoted to the other section and attached to the lateral supports by stationary pivots.

3. In a wind shield, in combination, a plurality of sections, one thereof being adapted for fixed attachment, brackets attached to such section and projecting above the same, locks for attaching the other section to such bracket extensions, and links pivoted to the other section and attached to the brackets by stationary pivots.

4. In a wind shield, in combination, a plurality of sections, one thereof being adapted for fixed attachment, brackets attached to such section and projecting above the same, locks for attaching the other section to such bracket extensions, links pivotally attached to the brackets and the last mentioned shield section, and engaging apertured bosses on opposite faces of the two shield sections and adapted to be secured together.

5. In a wind shield, in combination, a plurality of sections, one thereof being adapted for fixed attachment, brackets attached to such section and projecting above the same, locks for attaching the other section to such bracket extensions, links pivotally attached to the brackets and the last mentioned shield section, and stay rods attached to the brackets.

6. In a wind shield, in combination, a plurality of sections, one thereof being adapted for fixed attachment, brackets attached to such section and projecting above the same, locks for attaching the other section to such bracket extensions, links pivotally attached to the brackets and the last mentioned shield section, and the knuckles attached to the brackets and adapted for attachment to stay rods.

7. A wind shield for vehicles, comprising a lower section supported upon the vehicle, a non-reversible upper section movable into alinement with the lower section above the same, or parallel to and adjacent one side thereof, brackets carried by the lower section adjacent the ends thereof and extending outwardly therefrom in planes at an angle to the plane of the section, and links pivotally connected to said brackets and said upper section and movable in planes at right angles to the planes of the sections.

8. In a wind shield, in combination, a fixed upstanding section having its upper edge formed as a seat, a movable section having an edge adapted to engage such seat, and guide links uniting the two sections at both ends and being attached to each section by pivots having an unchanging relation to both the sections and the links and being movable past the ends thereof and being adapted to permit the movement of the second named section to the seat on the first named section and to a position parallel with and adjacent to the latter section.

9. A vertically disposed wind shield for vehicles, comprising a stationary lower section, a non-reversible movable upper section, guide links connecting the upper section with appurtenances of the lower section, and vertically disposed stops adapted to engage one side of the upper section and limit the lateral movement thereof as said upper section is moved into position.

10. A wind-shield for vehicles, comprising a lower section supported on the vehicle and a movable upper section, brackets carried by the lower section, adjacent each end thereof and adjacent the upper edge thereof, and extending outwardly therefrom in planes at an angle to the plane of the section, and links each pivotally connected at one end to a corresponding bracket by a stationary pivot and at the other end to said movable section.

11. In a wind shield, in combination, a plurality of sections, brackets secured to one section and each having an arm projecting outwardly therefrom, links pivoted to the other section and attached to the projecting arms by stationary pivots, and locking means for rigidly securing the sections in alinement.

12. In a wind shield, in combination, a plurality of sections, brackets secured to one section and each having an arm projecting outwardly therefrom, links pivoted to the other section and attached to the projecting arms by stationary pivots, and locking means including a lock or bolt carried by one of said sections and adapted to enter a recess in the other of said sections for rigidly locking said sections together in alinement.

13. A wind shield for vehicles comprising a lower section supported upon the vehicle, a non-reversible upper section movable into alinement with the lower section above the same or parallel to and adjacent one side thereof, brackets carried by the lower section adjacent the ends thereof, and extending outwardly therefrom in planes at an angle to the plane of the section, links pivotally connected to said brackets and said upper section, and locking pins carried by one of said sections and adapted to enter apertures in the other section.

14. A folding front for vehicles, comprising a stationary lower section, a movable upper section, connecting links, each having one end pivotally secured to said movable section and having the other end secured to a stationary pivot, locking members carried by said movable upper section adjacent its lower edge and adapted to engage with said lower section at the upper edge of the latter to lock said sections in alinement, and means adjacent the lower edge of said lower section for engaging with said locking members for locking said sections adjacent each other and substantially parallel.

15. A folding front for vehicles, comprising a stationary lower section, a movable upper section, connecting links each having one end pivotally secured to said movable section and having the other end secured to a stationary pivot, locking members carried by said movable upper section adjacent its lower edge and adapted to engage means on said lower section at the upper edge of the latter to lock said sections in alinement, and means adjacent the lower edge of said lower section for engaging with said locking members for locking said sections adjacent each other and substantially parallel.

JAMES WEBSTER.

Witnesses:
E. M. Klatcher,
Geo. E. Waldo.